United States Patent [19]
Kasiviswanathan

[11] Patent Number: 6,108,332
[45] Date of Patent: Aug. 22, 2000

[54] LOCAL NUMBER PORTABILITY FOR INTEREXCHANGE CARRIERS

[75] Inventor: Rajan Kasiviswanathan, Garland, Tex.

[73] Assignee: Ericsson Inc., Research Triangle Park, N.C.

[21] Appl. No.: 08/928,295

[22] Filed: Sep. 12, 1997

[51] Int. Cl.[7] ................................................. H04L 12/50
[52] U.S. Cl. ..................................... 370/360; 379/220
[58] Field of Search ................................. 370/522, 524, 370/360; 379/219, 220, 115, 221, 212, 243, 230, 201, 396, 229, 114

[56] References Cited

U.S. PATENT DOCUMENTS

| | | | |
|---|---|---|---|
| 5,625,681 | 4/1997 | Butler, II | 379/207 |
| 5,661,792 | 8/1997 | Akinpelu et al. | 379/221 |
| 5,887,056 | 3/1999 | Sonnenberg | 379/220 |

FOREIGN PATENT DOCUMENTS

| | | |
|---|---|---|
| 0 751 691 A2 | 1/1997 | European Pat. Off. . |
| 2 299 913 | 10/1996 | United Kingdom . |
| WO 97/33441 | 9/1997 | WIPO . |

OTHER PUBLICATIONS

PCT International Search Report dated Apr. 1, 1999.
J.J. Lichter, Lucent Technologies; *Generic Switching and Signaling Requirements for Number Portability*; Illinois Number Portability Workshop, Generic Requirements, Issue 1.03, Sep. 4, 1996; pp. 1–79.

*Primary Examiner*—Valencia Martin-Wallace
*Assistant Examiner*—Kim T. Nguyen
*Attorney, Agent, or Firm*—Jenkens & Gilchrist, P.C.

[57] ABSTRACT

A telecommunications system and method for managing Local Number Portability (LNP) querying for calls routed to Interexchange Carriers by providing a list of carriers in the Service Switching Point (SSP) (local service provider) for whom LNP querying is to be performed by the SSP. For example, calls destined to carriers on the list will be queried by the originating SSP, or other intermediate SSP, and calls destined for carriers not on the list will not be queried by the originating SSP, but instead will be directly routed to the carrier for LNP querying. Advantageously, the local service providers (SSPs) can perform LNP queries for calls destined to certain carriers and charge them for the queries. This will enable small long-distance carriers to provide competitive service in the network by purchasing the LNP querying facility from the SSPs. Furthermore, LNP querying will now be able to be provided for every call routed through an Interexchange Carrier (IXC), regardless of whether the IXC has LNP querying capability.

31 Claims, 4 Drawing Sheets

LOCAL NUMBER PORTABILITY FOR INTEREXCHANGE CARRIERS

BACKGROUND OF THE PRESENT INVENTION

1. Field of the Invention

The present invention relates generally to telecommunications systems and methods for managing ported calls, and specifically to Service Switching Points (SSPs) selectively performing Local Number Portability (LNP) queries for calls routed to Interexchange Carriers (IXC).

2. Background and Objects of the Invention

Since the beginning of the telephone in the 1870's, signaling has been an integral part of telephone communications. The first telephone devices depended on the receiving party standing next to the receiver at the time of the call. Later, after the formation of the Bell Telephone Company, Alexander Graham Bell's assistant Watson invented the telephone ringer, eliminating the foreknowledge requirement. By lifting the receiver and allowing DC current to flow through the phone and back through the return of the circuit, a lamp would be lit on the exchange operator's switchboard to signal the operator that a call was trying to be placed.

However, early signaling methods were somewhat limited because they used the same circuit for both signaling and voice. In addition, they were analog and had a limited number of states, or values, that could be represented. In the early 1960's, Europe began digitizing the network, removing the signaling from the voice network, and placing the phone signals on a separate network. With this division of signaling and voice, the call setup and tear-down procedures required with every phone call were performed faster, while reserving the separate voice and data circuits for use when a connection was possible, e.g., no voice connection is needed when the called party's number is busy. Common Channel Signaling (CCS), which uses a digital facility, but places the signaling information in a time slot or channel separate from that of the voice or data it is related to, has become the foundation for telecommunications today.

In modern telecommunications networks, signaling constitutes the distinct control infrastructure that enables provision of all other services. It can be defined as the system that enables stored program control exchanges, network databases, and other "intelligent" nodes of the network to exchange: (a) messages related to call setup, supervision, and tear-down; (b) information needed for distributed applications processing (inter-process query/response); and (c) network management information.

In addition, the Intelligent Network (IN) and the new Advanced Intelligent Network (AIN) have made possible the transfer of all types of information through the telephone network without special circuits or long installation cycles. In the IN/AIN, everything is controlled or configured by workstations with user-friendly software. Telephone service representatives can, therefore, create new services and tailor a subscribers service from a terminal while talking with the customer. These changes are immediately and inexpensively implemented in the switches, rather than by the more traditional method: expensive programming changes made by certified technicians.

The IN consists of a series of intelligent nodes, each capable of processing at various levels, and each capable of communicating with one another over data links. The basic infrastructure needed is composed of various signaling points, which both perform message discrimination (read the address and determine if the message is for that node), and route messages to other signaling points. The basic three types of signaling points are: (1) Service Switching Points (SSPs); (2) Signal Transfer Points (STPs); and (3) Service Control Points (SCPs), each of which are described in more detail hereinafter.

With reference now to FIG. 1 of the drawings, the many Service Switching Points (SSPs) 100 serve as the exchanges in a telephone network 90, a portion of which is shown in FIG. 1. Across the country, groups of SSPs 100 are divided into separate Local Access Transport Areas (LATA) 130. Calls placed within a single LATA 130 are handled by the local exchange carriers (LEC), e.g., GTE, while calls placed interLATA, that is between separate LATAs 130, are handled by Interexchange Carriers (IXC), e.g., AT&T, which provide long-distance service to customers within a number of LATAs. The LECs and IXCs are separate types of SSPs 100, which provide either local or long-distance service respectively to subscribers.

The STP 110 serves as a router, and switches messages received from a particular SSP 100 through the network 90 to their appropriate destinations (another SSP 100). As is also understood in the art, the STP 110 receives messages in packet form from the SSPs 100. These packets are either related to call connections or database queries. If the packet is a request to connect a call, the message must be forwarded to a destination end office (another SSP 100), where the call will be terminated.

If, however, the message is a database query seeking additional information, the destination will be a database. Database access is provided through the Service Control Point (SCP) 120, which does not store the information, but acts as an interface to a computer that houses the requested information.

Presently, a subscriber on one SSP 100 has the ability to move to a different SSP 100 within the same LATA 130 while retaining their public directory number. This is referred to as local number portability. One key advantage of local number portability is that other subscribers can connect to the ported subscriber without any changes to their dialing procedures.

If a subscriber has been ported-out to another SSP 100, the Initial Address Message (IAM) sent by the originating SSP 100 must be modified to account for the change in the terminating SSP, as is understood in the art. The Local Number Portability (LNP) database is the database that holds the Location Routing Numbers (LRN), which are ten-digit numbers used to uniquely identify the switch that has the ported-out number. Specifically, the LRN is the number for the recipient switch, which is the switch that has ported-in a number from another switch (called a donor switch). This ported-in number was not previously served by the recipient switch.

Typically, the SSP 100 sends a LNP query to the SCP 120, which accesses the LNP database in order to retrieve the routing information for a ported subscriber. The query response by the SCP 120 provides that SSP 100 with the pertinent LRN, which is populated (that is placed) in the Called Party Number (CPN) parameter in the IAM. The Ported Dialed Number (PDN), e.g., the actual dialed digits for the ported-out subscriber, is placed in the Generic Address Parameter (GAP) in the IAM. The Forward Call Indicator (FCI) M-bit in the IAM is then updated to indicate that the number has been translated. The FCI M-bit is used as a fail-safe mechanism to prevent more than one LNP query from being launched on a call.

If the end-user has not been ported-out, the SCP 120 will return the actual dialed number, not the LRN, to be stored in the CPN parameter. In this case, the GAP is not included in the IAM. It should be noted that the FCI M-bit is always set to "Number Translated" after any LNP query, regardless of whether the end-user has been ported-out or not.

Each subscriber has associated therewith a three-digit Numbering Plan Area (NPA), e.g., area code, and a three-digit Office Code (NXX), e.g., the first three digits of a seven-digit telephone number. Each SSP stores within it a list of LNP triggers, which are the NPANXX digit streams associated with subscribers who have the ability to port, whether or not any subscribers having that NPANXX actually are ported. Every time a call is placed to a subscriber on a different SSP than the calling party's SSP, the originating SSP, which is the SSP responsible for the subscriber placing the call, checks the LNP trigger for the called party to determine if a LNP query should be performed prior to routing the call to the called party's switch. Each LNP trigger has a condition known as a LNP trigger criteria type associated with it. The LNP trigger criteria types are indicators stored in the switch by command or other method, which can be set to either "query" or "do not query", depending upon different conditions.

Presently, for calls to subscribers having a NPANXX which is a LNP trigger, which are routed to an Interexchange Carrier (IXC), e.g., long-distance calls, such as 1 plus dialing, 10XXX dialing (such as 10288 for AT&T), or 101XXXX dialing, the LNP trigger criteria type is always set to either "query", which instructs the originating SSP to perform a LNP query to the SCP before routing the call to the IXC, or "do not query", which instructs the originating SSP to never perform a LNP query prior to routing the call to the IXC, regardless of the LNP querying capability of the IXC. Therefore, for conventional systems to be implemented successfully, all carriers (IXCs) would need to possess LNP querying capability to deliver calls to ported numbers. Otherwise, the calls would be routed to the donor switches, which results in excessive switching and delays. However, with the increase in the number of small sized competitive access providers (CAPs) entering the long-distance carrier market, it will not be possible for all the small carrier companies to provide LNP querying capability.

Existing systems also present a problem in the case where a single switch acts as both an end office (EO) and an IXC without loop back of calls, which is explained hereinafter. Many EO/IXC switches have a logical boundary between the EO services and the IXC services. Therefore, when a long-distance call is placed, the EO actually routes the call on trunk lines out of the switch back to the IXC in the switch, which enables the EO and the IXC to function independently within the same switch. Thus, for a call to a NPANXX having a "do not query" LNP trigger criteria type associated with it, the EO will route the call to the appropriate IXC, either within its switch or to another chosen by the subscriber, for a LNP query.

However, when no logical boundary exists between the EO and the IXC, and the internal IXC is used to place a call to a NPANXX having a "do not query" LNP trigger criteria type associated with it, the EO/IXC does not perform the LNP query. Instead, the EO/IXC routes the call to the donor switch, thus incurring a charge from the donor switch for a LNP query which the EO/IXC was capable of performing.

Furthermore, conventional systems employing LNP querying for IXC routed calls do not allow local service providers (SSPs) to sell their LNP querying capability on a per carrier basis, which is inefficient for both the SSPs and the IXCs.

It is therefore one object of the invention to provide LNP querying by the SSP for calls routed to selective Interexchange Carriers that do not possess LNP querying capability to prevent routing of calls to donor switches.

It is a further object of the invention to allow local SSPs to sell their LNP querying capability on a per carrier basis.

It is still a further object of the invention to allow the EO within the EO/IXC single switch, which does not have the loop back of calls ability, to perform a LNP query for the IXC regardless of whether the LNP trigger criteria type is set to "query" or "do not query".

SUMMARY OF THE INVENTION

The present invention is directed to telecommunications systems and methods for managing LNP querying for calls routed to carriers (IXCs) by providing a list of carriers in the SSP (local service provider) for whom LNP querying is to be performed by the SSP. For example, calls destined to carriers on the list will be queried by the originating SSP, or other intermediate SSP where the list is present, and calls destined for carriers not on the list will not be queried by the originating SSP, but instead will be directly routed to that carrier for LNP querying. Advantageously, the local service providers (SSPs) can perform LNP queries primarily for calls destined to certain carriers and charge those carriers for the queries on a per carrier basis. This will enable small long-distance carriers to provide competitive service in the network by purchasing the LNP querying capability from the SSPs. In addition, larger long-distance companies can choose to maintain their LNP querying capability and not purchase it from the SSPs, although there may be instances where LNP queries are performed by the SSPs. Alternatively, larger long-distance companies can opt to remove their LNP querying capability and purchase it from the SSPs depending on the particular needs of the company and the cost-efficiencies of performing LNP queries. The innovative systems and methods of the present invention help to prevent routing of calls to donor switches, when using an IXC, by allowing the SSPs to perform LNP queries on a per carrier basis.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
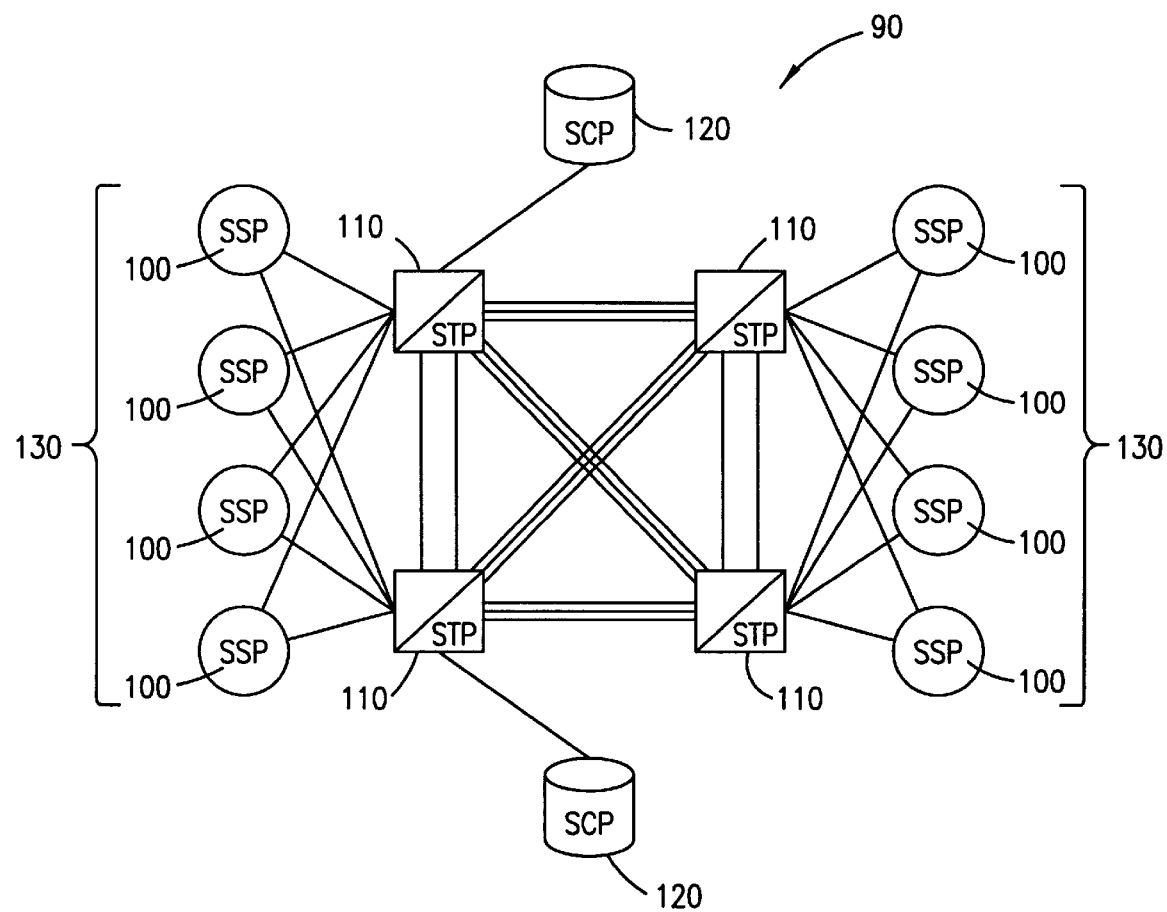
FIG. 1 is a block diagram illustrating some of the basic components used in an Intelligent Network or an Advanced Intelligent Network for signal switching.
Figure 2:
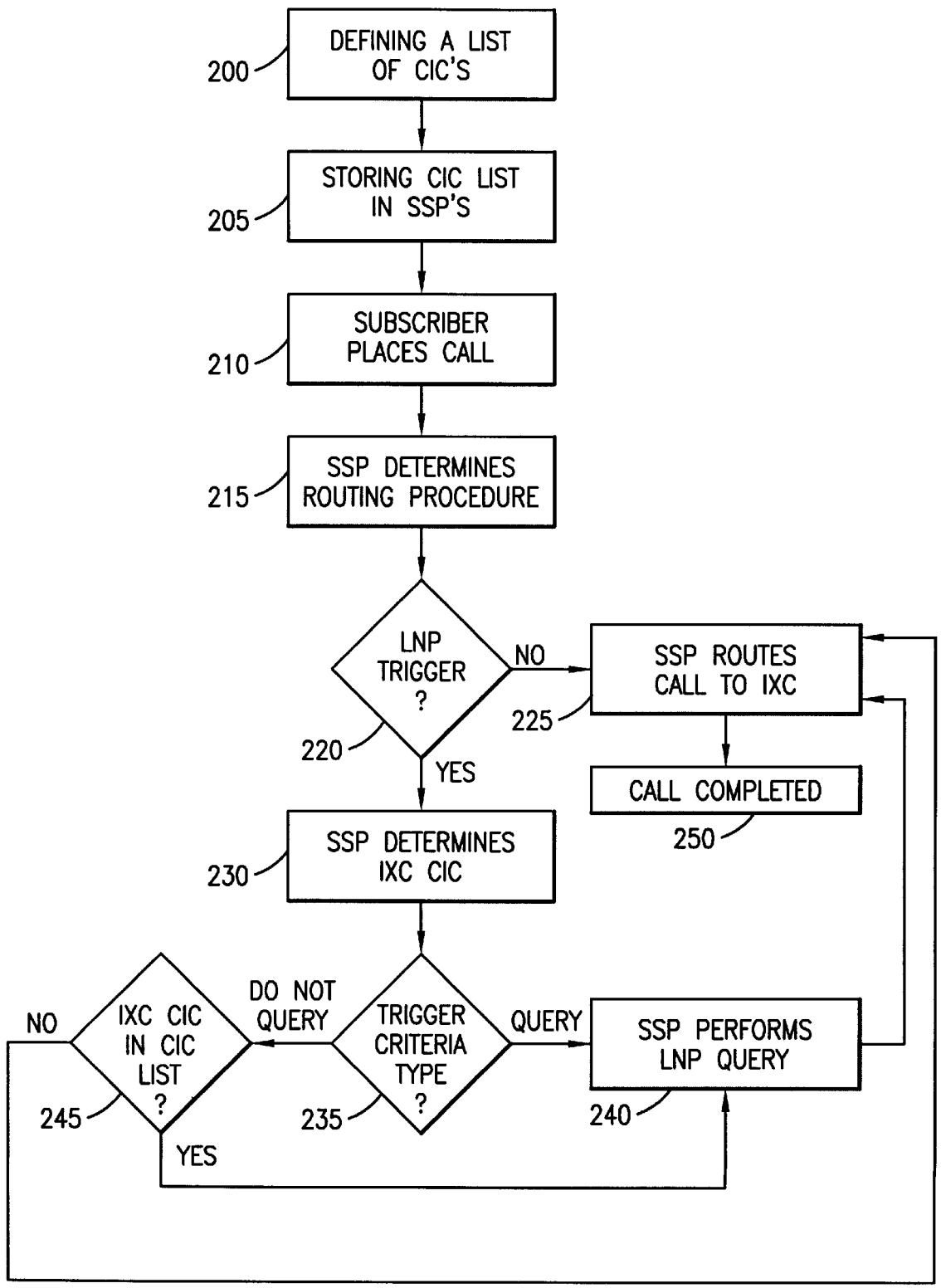
FIG. 2 is flow chart describing a preferred embodiment of the Carrier Identification Code system of the present invention.

With reference now to FIG. 2 of the drawings, a preferred embodiment of the LNP querying system of the present invention for IXC routed calls is depicted in which a list of carriers, by Carrier Identification Codes, is defined (step 200) and stored (step 205), for example, as a database in a memory, in the SSPs (local service providers).

Once a subscriber places a call (step 210), the originating SSP 100 determines the routing procedure (step 215), e.g., by a method known as B number analysis, which takes each dialed digit and compares it with a set of translation tables, called exchange data, to determine if the call is to its switch or to another switch, either within its LATA 130 (intraLATA) or in another LATA 130 (interLATA), as is well known in the art. If the call is an interLATA call, e.g., a long-distance call, as determined by the aforementioned B number analysis method, the originating SSP 100 first compares the NPANXX digit stream dialed by the calling party with a list of LNP triggers (step 220), which are NPANXX digit streams having subscribers who may be ported, to determine if the called party has the ability to port. If the NPANXX is not an LNP trigger, the originating SSP 100 routes the call to the IXC (step 225) to establish a connection with the terminating SSP 100 (step 250), which is the SSP 100 serving the called party.

However, if the call is an interLATA call and the NPANXX is a LNP trigger, the originating SSP 100 then checks to see if the calling party either entered a dialed carrier, e.g., 10XXX, prior to the called party number, or has a presubscribed carrier associated with it (step 230). Equal Access functionality allows a subscriber to use any IXC for any call, regardless of the presubscribed carrier chosen. (If a subscriber chooses an IXC to handle 1 plus dialing, the Carrier Identification Code (CIC), e.g., 10XXX, for that presubscribed carrier is stored within the SSP 100 serving that subscriber.) If no carrier is dialed or presubscribed, the SSP 100 returns a message to the calling party to choose an IXC to handle the call.

Thereafter, the originating SSP 100 checks the LNP trigger criteria type (step 235), e.g., "query" or "do not query", for IXC destined calls, in addition to other checks, as is well-known in the art. If the LNP trigger criteria is set to "query", the SSP 100 performs the LNP query (step 240) prior to routing the call to the IXC (step 225). However, if the LNP trigger criteria is set to "do not query", the originating SSP 100 then compares the Carrier Identification Code (CIC) for the IXC chosen, e.g., 10XXX, or 101XXXX, with the list of CICs stored in the SSP 100 (step 245) to determine whether the carrier (IXC) chosen by the calling party has instructed the originating SSP 100 to perform the LNP query even though the LNP trigger criteria is set to "do not query". If the CIC for the chosen carrier is on the list stored in the originating SSP 100, the SSP 100 will perform the LNP query to the SCP 120 (step 240) prior to routing the call to the IXC (step 225).

If, however, the CIC for the chosen carrier is not on the list stored in the SSP 100, the SSP 100 will not perform a LNP query, but instead will route the call to the IXC to perform a LNP query (step 225). The call is then completed (step 250) normally, as is well-known in the art.

It should be noted that the CIC list stored in the SSP 100 can include either the 10XXX and 101XXXX information, or alternatively, can include only the XXX and XXXX information, without the preceding 1's and 0. In the latter case, only the digits after the 1's and 0 associated with each carrier will be compared with the CIC list stored in the SSP 100.

Figure 3A:
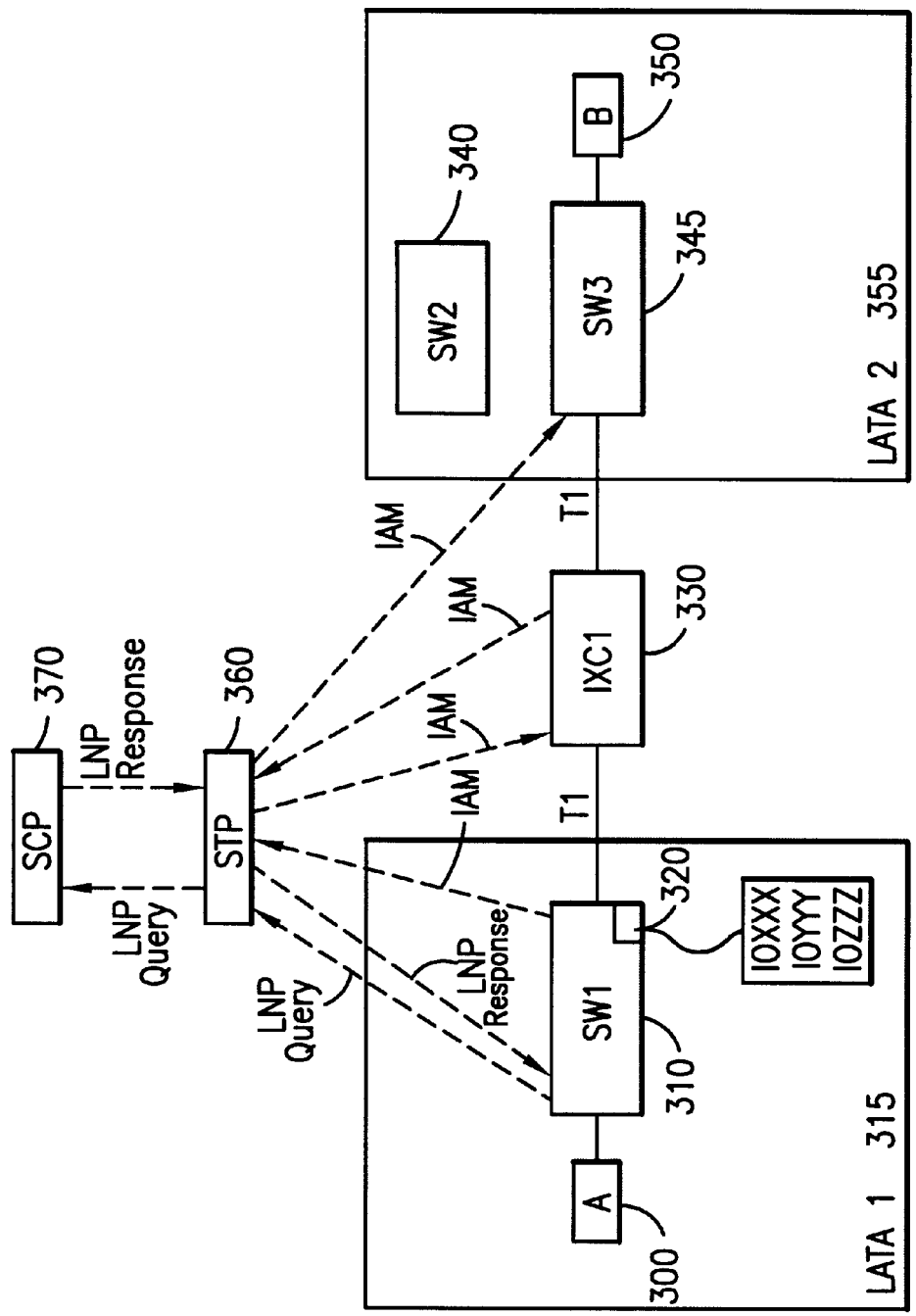
FIGS. 3A and 3B are block diagrams demonstrating sample LNP querying situations for IXC routed calls.
Figure 3B:
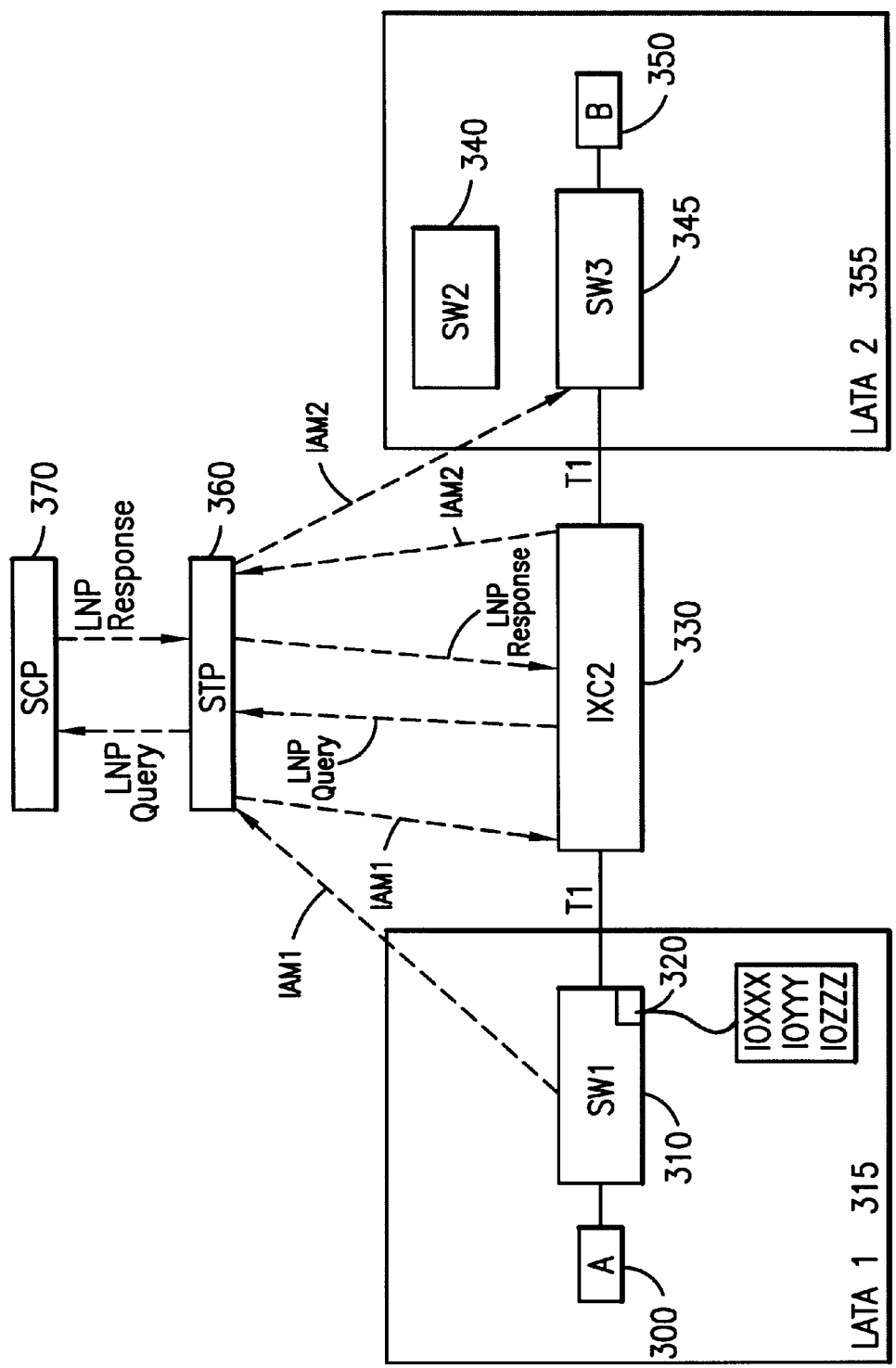

The logical relationship between the SSPs and the IXCs is further illustrated in FIGS. 3A and 3B. For the case where the LNP trigger criteria is set to "do not query", there are two possible outcomes, each of which are shown separately in FIGS. 3A and 3B. As depicted in FIG. 3A, subscriber A 300, which is in a first LATA 315, has placed a call to subscriber B 350, which has been ported-out from Switch 2 340 to Switch 3 345 within a second LATA 355. To connect the call, subscriber A 300 has chosen Interexchange Carrier IXC1 330, either as a presubscribed carrier or as a dialed carrier, which is a non-LNP capable Interexchange Carrier. Initially, the originating SSP 310, hereinafter referred to as SW1, must first determine whether the NPANXX digit stream dialed by subscriber A 300 is a LNP trigger. Assuming that the NPANXX is a LNP trigger, SW1 310 then determines the Carrier Identification Code (CIC) for IXC1 330, e.g., 10XXX. For the case where the LNP trigger criteria is set to "do not query", SW1 310 then compares the CIC for IXC1 330 with a list of CICs 320 stored in SW1 310, which are associated with Interexchange Carriers that have paid SW1 310 to perform the LNP query prior to routing.

As can be seen in FIG. 3A, 10XXX is on the list of CICs 320 stored in SW1 310, and therefore, SW1 310 will perform the LNP query, through signaling channels, shown as dotted lines, towards the SCP 370 through the STP 360. Based on the results received from the LNP response, the originating switch SW1 310 then modifies the Initial Address Message (IAM) by placing the Location Routing Number (LRN) for the recipient switch SW3 345 in the Called Party Number parameter and the Ported Dialed Number (PDN) for subscriber B 350 in the Generic Address Parameter (GAP), as described hereinbefore, and as is well-known in the art. SW1 310 also sets the FCI (M-bit) to "Number Translated", as discussed hereinbefore.

Thereafter, SW1 310 routes the IAM on signaling channels to the IXC1 330 via the STP 360 and seizes a physical channel T1 for routing of the call to the IXC1 330. The IXC1 330 then routes the IAM to the recipient switch SW3 345 via the STP 360 and seizes physical channel T1 for routing of the call to SW3 345. SW3 345 then terminates the call on its switch to subscriber B 350.

However, as shown in FIG. 3B, if the LNP trigger criteria is set to "do not query" and the CIC associated with IXC2 335, which is LNP capable, is 10WWW, the originating switch SW1 310 will route the call to the IXC2 335 without performing a LNP query, because the CIC, 10WWW, is not on the list 320 of CICs for whom querying is to be performed by SW1 310. In this situation, the IXC2 335 will perform the LNP query and modify the original IAM (IAM1) accordingly, as discussed hereinbefore. The modified IAM (IAM2) is then sent to the recipient switch SW3 345 via the STP 360, where the call can then be terminated to subscriber B 350.

The list 320 of Carrier Identification Codes stored in the SSPs 310, which are associated with Interexchange Carriers 330 and 335 wanting the SSPs 310 to perform LNP queries, along with the LNP trigger criteria types, e.g., "query" or "do not query", enable LNP and non-LNP capable IXCs 335 and 330, respectfully, to effectively handle ported-out calls, without unduly burdening the donor switches 340. IXCs without LNP querying capability 330 can pay the SSPs 310 to perform their LNP queries and SSPs 310 can charge the IXCs 330 for LNP queries on a per carrier basis. Therefore, in a preferred embodiment, the LNP trigger criteria type will always be set to "do not query" in order to prevent querying by SSPs 310 for IXCs that are LNP capable 335. In the aforementioned manner, the SSPs 310 would only query for those IXCs 330 who have paid for the service on a per carrier basis.

In addition, for the EO/IXC 310/330 single switch situation, by having a list 320 of CICs stored within the switch, which includes the IXC 330 of the switch, the EO/IXC 310/330 is prevented from routing the call to the donor switch 340. For example, if the LNP trigger criteria type is set to "do not query", the EO 310 will check the CIC list 320 and compare it to the CIC of the IXC 330 used by the calling party. If the IXC 330 used by the subscriber is the IXC 330 within the switch, and the CIC for that IXC 330 is on the list 320, the EO 310 will perform a LNP query for the call and route it to the appropriate terminating switch 345.

As will be recognized by those skilled in the art, the innovative concepts described in the present application can be modified and varied over a wide range of applications. Accordingly, the scope of patented subject matter should not be limited to any of the specific exemplary teachings discussed.

What is claimed is:

1. A telecommunications system for performing a local number portability query for a long distance call, comprising:
   a select one of a plurality of interexchange carriers for receiving said long distance call, each of said plurality of interexchange carriers having a carrier identification code associated therewith; and
   a local service switching point for routing said long distance call to said select interexchange carrier, said local service switching point having a code list stored therein, said code list including said carrier identification codes associated with requesting ones of said interexchange carriers that have requested said local service switching point to perform local number portability queries for all calls routed to said requesting interexchange carriers, said local service switching point being adapted to compare said carrier identification code associated with said select interexchange carrier with said code list and perform, prior to routing said long distance call to said select interexchange carrier, said local number portability query in response to a determination that said carrier identification code associated with said select interexchange carrier is on said code list.

2. The telecommunications system of claim 1, wherein said long distance call has a criteria type associated therewith, said criteria type being stored in said local service switching point, said local service switching point adapted to perform said local number portability query when said criteria type is set to "query."

3. The telecommunications system of claim 2, wherein said criteria type is associated with a local number portability trigger, said local number portability trigger including a three-digit Numbering Plan Area and a three-digit Office Code.

4. The telecommunications system of claim 3, wherein said local number portability trigger is associated with a plurality of subscribers, each said subscriber having the ability to port.

5. The telecommunications system of claim 1, wherein said long distance call has a criteria type associated therewith, said local service switching point being adapted to perform said local number portability query when said criteria type is set to "do not query" and said carrier identification code associated with said select interexchange carrier is on said code list.

6. The telecommunications system of claim 1, wherein said long distance call has a criteria type associated therewith, said select interexchange carrier being adapted to perform said local number portability query when said criteria type is set to "do not query" and said carrier identification code associated with said select interexchange carrier is not on said code list.

7. The telecommunications system of claim 1, further comprising:
   a plurality of signaling transfer points, each of said signaling transfer points being in communication with at least one of a plurality of service control points, said local service switching point being adapted to forward said local number portability query to a given one of said service control points through a given one of said signaling transfer points and receive a response from said given service control point.

8. The telecommunications system of claim 7, wherein said service control point is adapted to communicate with a local number portability database to perform said local number portability query.

9. The telecommunications system of claim 7, wherein said local service switching point is adapted to create an address message having routing information therein, based on said response, said long distance call being routed to a second local service switching point using said address message.

10. The telecommunications system of claim 9, wherein said address message comprises:
    a Called Party Number parameter,
    a Generic Address parameter, and
    a Forward Call Indicator M-bit.

11. The telecommunications system of claim 10, wherein said routing information includes a Location Routing Number and a Ported Dialed Number, said Location Routing Number being located in said Called Party Number parameter, said Ported Dialed Number being located in said General Address Parameter, and said Forward Call Indicator M-bit being set to "Number Translated."

12. The telecommunications system of claim 10, wherein said routing information includes an actual dialed number, said actual dialed number being returned from said given service control point into said Called Party Number parameter, said Forward Call Indicator M-bit being set to "Number Translated".

13. The telecommunications system of claim 1, wherein said second local service switching point is a recipient switch.

14. The telecommunications system of claim 1, wherein said select interexchange carrier is not capable of performing said local number portability query.

15. The telecommunications system of claim 1, wherein said select interexchange carrier is capable of performing said local number portability query.

16. The telecommunications system of claim 1, wherein said local service switching point is located within a first local access transport area, and a second local service switching point that said select interexchange carrier routes said lone distance call to is located within a second local access transport area.

17. The telecommunications system of claim 1, wherein said local service switching point and said select interexchange carrier are located within the same switch.

18. The telecommunications system of claim 1, wherein said local service switching point charges said select interexchange carrier for performing local number portability queries on a per carrier basis.

19. The telecommunications system of claim 1, wherein said select interexchange carrier is a presubscribed carrier.

20. The telecommunications system of claim 1, wherein said select interexchange carrier is a dialed carrier.

21. The telecommunications system of claim 1, wherein said code list consists of a first code type and a second code type, said first code type being "10" followed by a three-digit code, said second code type being "101" followed by a four-digit code.

22. The telecommunications system of claim 1, wherein said code list consists of a first code type and a second code type, said first code type being a three-digit code, said second code type being a four-digit code.

23. A method for performing a local number portability query when a long distance call is routed through a select one of a plurality of interexchange carriers, each of said interexchange carriers having a carrier identification code associated therewith, said method comprising the steps of:

storing a code list in a local service switching point, said code list including said carrier identification codes associated with requesting ones of said interexchange carriers that requested said local service switching point to perform local number portability queries for all calls routed to said requesting interexchange carriers;

receiving said long distance call to be routed to said select interexchange carrier at said local service switching point;

comparing said carrier identification code associated with said select interexchange carrier with said code list stored in said local service switching point;

performing said local number portability query by said local service switching point when said carrier identification code associated with said select interexchange carriers is on said code list; and routing said call through said select interexchange carrier.

24. The method of claim 23, wherein said long distance call has a criteria type associated therewith, said criteria type being stored in said local service switching point, and further comprising the step of:

before said step of comparing, performing said local number portability query by said local service switching point when said criteria type is set to "query."

25. The method of claim 24, wherein said criteria type is associated with a local number portability trigger, said local number portability trigger including a three-digit Numbering Plan Area and a three-digit Office Code.

26. The method of claim 25, wherein said local number portability trigger is associated with a plurality of subscribers, each said subscriber having the ability to port.

27. The method of claim 23, wherein said lone distance call has a criteria type associated therewith, said step of performing said local number portability query being performed when said criteria type is set to "do not query" and said carrier identification code associated with said select interexchange carrier is on said code list.

28. The method of claim 23, wherein said lone distance call has a criteria type associated therewith, and further comprising the step of:

performing said local number portability query by said select interexchange carrier when said criteria type is set to "do not query" and said carrier identification code associated with said select interexchange carrier is not on said code list.

29. The method of claim 23, wherein said step of performing further comprises the steps of:

forwarding said local number portability query from said local service switching point to a given one of a plurality of service control points through a given one of a plurality signaling transfer points; and receiving a response at said local service switching point from said given service control point.

30. The method of claim 29, wherein said step of performing further comprises the steps of:

communicating with a local number Portability database by said given service control point to perform said local number portability query.

31. The method of claim 29, wherein said local service switching point creates an address message having routing information therein, based on said response, and further comprising the step of:

routing said long distance call to a second local service switching point using said address message.

* * * * *

UNITED STATES PATENT AND TRADEMARK OFFICE
CERTIFICATE OF CORRECTION

PATENT NO. : 6,108,332
DATED : August 22, 2000
INVENTOR(S) : Rajan Kasiviswanathan Page 1 of 1

It is certified that error appears in the above-identified patent and that said Letters Patent is hereby corrected as shown below:

Column 8,
Line 61, replace "lone" with -- long --

Column 10,
Line 8, replace "lone" with -- long --
Line 14, replace "lone" with -- long --

Signed and Sealed this

Sixteenth Day of October, 2001

Attest:

NICHOLAS P. GODICI
Attesting Officer    Acting Director of the United States Patent and Trademark Office